(12) United States Patent
Hsieh et al.

(10) Patent No.: US 10,908,086 B2
(45) Date of Patent: Feb. 2, 2021

(54) SIGNAL PROCESSING SYSTEM AND METHOD THEREOF

(71) Applicant: Industrial Technology Research Institute, Hsinchu (TW)

(72) Inventors: Cho-Fan Hsieh, Hsinchu (TW); Feng-Chieh Li, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 148 days.

(21) Appl. No.: 16/232,606

(22) Filed: Dec. 26, 2018

(65) Prior Publication Data
US 2020/0209159 A1   Jul. 2, 2020

(51) Int. Cl.
*G01N 21/64* (2006.01)
*G02B 21/16* (2006.01)

(52) U.S. Cl.
CPC ..... *G01N 21/6456* (2013.01); *G01N 21/6486* (2013.01); *G02B 21/16* (2013.01); *G01N 2021/6419* (2013.01); *G01N 2021/6471* (2013.01)

(58) Field of Classification Search
CPC .......... G01N 21/6456; G01N 21/6486; G01N 2021/6471; G01N 2021/6419; G01N 2223/401; G02B 21/16; G06T 1/00; G06T 2201/00; G06T 2207/30; G06K 9/00114
See application file for complete search history.

(56) References Cited

U.S. PATENT DOCUMENTS

| 6,459,596 B1 | 10/2002 | Corzine | |
|---|---|---|---|
| 2003/0058360 A1* | 3/2003 | Liu | H04N 5/37455 348/308 |

FOREIGN PATENT DOCUMENTS

| CN | 201229696 Y | 4/2009 |
|---|---|---|
| CN | 104897279 A | 9/2015 |
| TW | 201012201 A | 3/2010 |
| TW | 201303344 A | 1/2013 |
| TW | 201800776 A | 1/2018 |
| TW | M556045 U | 2/2018 |

* cited by examiner

*Primary Examiner* — Abdullahi Nur
(74) *Attorney, Agent, or Firm* — Mintz Levin Cohn Ferris Glovsky and Popeo, P.C.; Peter F. Corless; Steven M. Jensen

(57) ABSTRACT

A signal processing method and a signal processing system are provided to convert optical or electric signals by an effective circuit to have an increased dynamic contrast and reduced noises. The signal processing system includes an analog signal processing module and a digital signal processing module. When an optical signal of an object-to-be-detected is strong, an image-to-be-detected is obtained by an analog signal processing method. When the optical signal of the object-to-be-detected is weak, the image-to-be-detected is obtained by a digital signal processing method after background noises are filtered out.

13 Claims, 5 Drawing Sheets

SIGNAL PROCESSING SYSTEM AND METHOD THEREOF

BACKGROUND

1. Technical Field

This disclosure relates to a signal processing system and a signal processing method thereof.

2. Description of Related Art

Developed since 1990, multiphoton excited fluorescence (MPEF) microscopes have been applied to biological image observation and medical research rapidly and extensively. MPEF microscopes have various advantages, such as natural optical sectioning, low biology intrusive, low photobleaching and deep biology penetration depth.

However, as the samples emit fluorescence of different intensity, a variety of MPEF microscope systems having different architectures have to be used to measure the fluorescence. Such a scenario is not feasible, and inevitably increases the cost of the instrument apparatus.

SUMMARY

In an embodiment, a signal processing system according to the present disclosure includes: at least one optical detector configured for receiving an optical signal emitted from one of a plurality of positions-to-be-detected of an object-to-be-detected and generating a photocurrent signal; an analog signal processing module configured for receiving the photocurrent signal and generating a first analog voltage signal; a digital signal processing module configured for receiving the photocurrent signal and generating a second analog voltage signal after filtering out noises of the photocurrent signal; and an image processing unit configured for receiving the first analog voltage signal and the second analog voltage signal, and generating an image-to-be-detected of the object-to-be-detected based on the first analog voltage signal when the optical signal is strong, or generating the image-to-be-detected of the object-to-be-detected based on the second analog voltage signal when the optical signal is weak.

In another embodiment, a signal processing method according to the present disclosure includes: receiving an optical signal emitted from one of a plurality of positions-to-be-detected of an object-to-be-detected and generating a photocurrent signal; determining intensity of the optical signal; when the optical signal is strong, converting the photocurrent signal into a first analog voltage signal and generating an image-to-be-detected of the object-to-be-detected based on the first analog voltage signal; and when the optical signal is weak, filtering out noises of the photocurrent signal, converting the photocurrent signal into a second analog voltage signal, and generating an image-to-be-detected of the object-to-be-detected based on the second analog voltage signal.

BRIEF DESCRIPTION OF DRAWINGS

The present disclosure can be more fully understood by reading the following detailed description of the embodiments, with reference made to the accompanying drawings, wherein.

DETAILED DESCRIPTION

Figure 1:
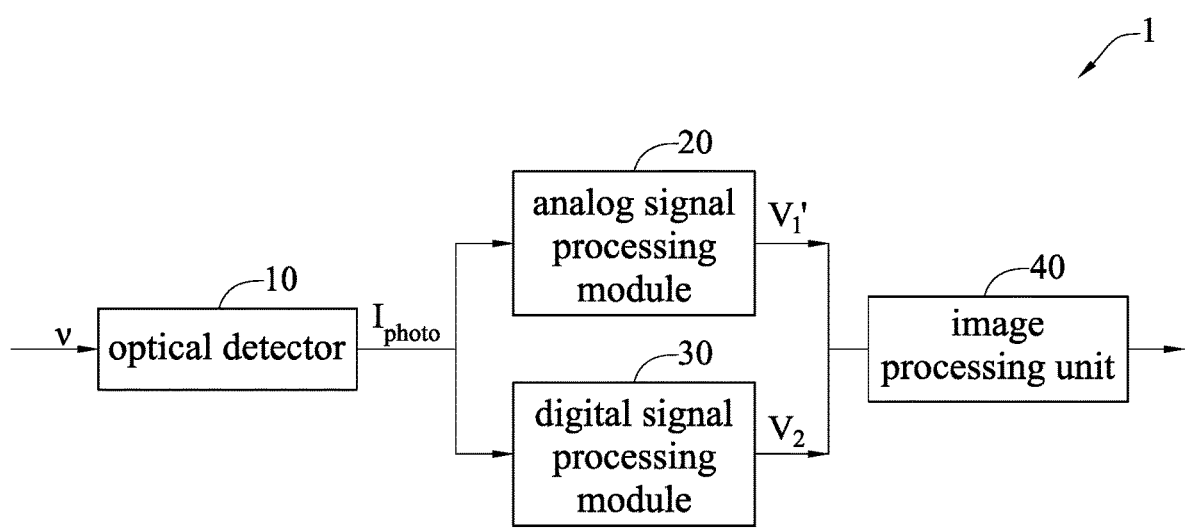
FIG. 1 is a functional block diagram of a signal processing system of an embodiment according to the present disclosure.

FIG. 1 is a functional block diagram of a signal processing system 1 of an embodiment according to the present disclosure. The signal processing system 1 comprises at least one optical detector 10, an analog signal processing module 20, a digital signal processing module 30 and an image processing unit 40. The optical detector 10 is configured for receiving an optical signal v emitted from one of a plurality of positions-to-be-detected of an object-to-be-detected and generating a photocurrent signal Iphoto. In an embodiment, the optical detector 10 is, but not limited to, a photomultiplier tube (PMT). In another embodiment, a plurality of optical detector 10 are used to capture optical signals of the plurality of positions-to-be-detected of the object-to-be-detected in a multiple-channel manner.

The analog signal processing module 20 is configured for receiving the photocurrent signal Iphoto and generating a first analog voltage signal $V_1$. The digital signal processing module 30 is configured for receiving the photocurrent signal Iphoto, filtering out noises of the photocurrent signal Iphoto, and generating a second analog voltage signal $V_2$. The image processing unit 40 is configured for receiving the first analog voltage signal $V_1$ and the second analog voltage signal $V_2$, generating an image-to-be-detected of the object-to-be-detected based on the first analog voltage signal $V_1$ when the optical signal v is strong, and generating the image-to-be-detected of the object-to-be-detected based on the second analog voltage signal $V_2$ when the optical signal v is weak.

Figure 2:
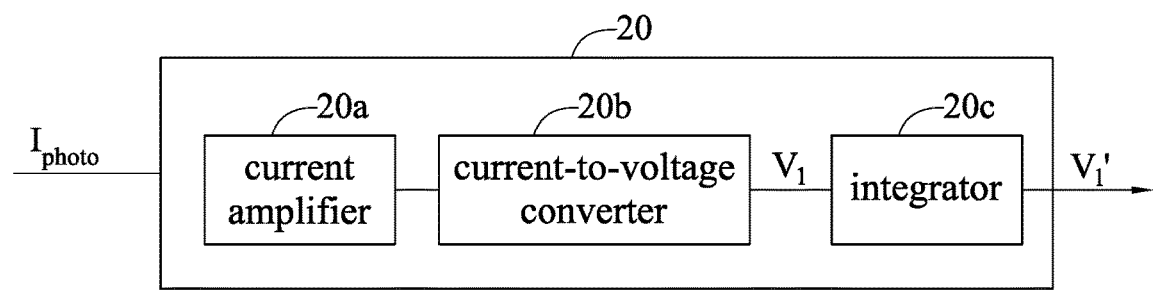
FIG. 2 is a functional block diagram of an analog signal processing module of an embodiment according to the present disclosure.

FIG. 2 is a functional block diagram of an analog signal processing module 20 of an embodiment according to the present disclosure. The analog signal processing module 20 comprises a current amplifier 20a, a current-to-voltage converter 20b and an integrator 20c. The current amplifier 20a is configured for amplifying the photocurrent signal Iphoto. The current-to-voltage converter 20b is configured for converting the amplified photocurrent signal Iphoto into a first analog voltage signal $V_1$. The integrator 20c integrates the first analog voltage signal $V_1$ and generates an integrated first analog voltage signal $V_1'$.

Figure 3:
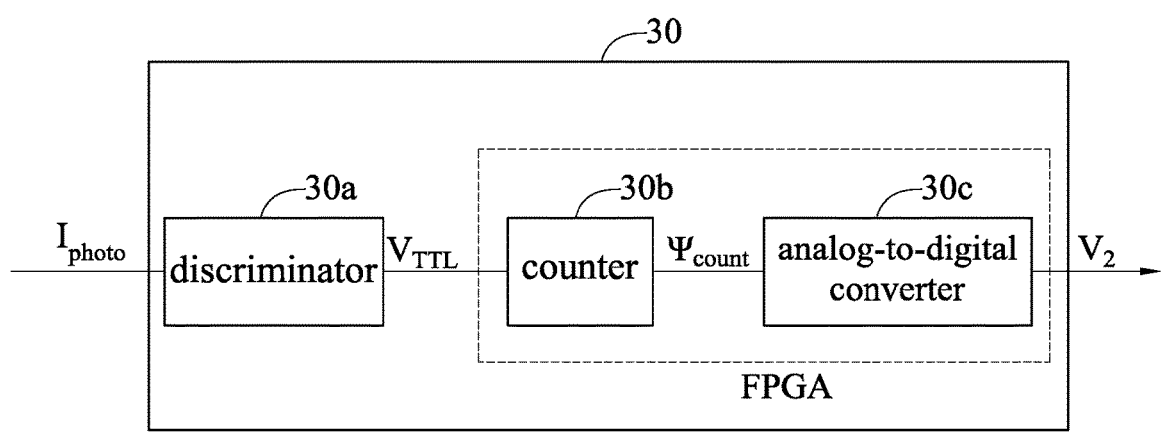
FIG. 3 is a functional block diagram of a digital signal processing module of an embodiment according to the present disclosure.

FIG. 3 is a functional block diagram of a digital signal processing module 30 of an embodiment according to the present disclosure. The digital signal processing module 30 comprises a discriminator 30a, a counter 30b and an analog-to-digital converter 30c. The discriminator 30a is configured for converting the photocurrent signal Iphoto into a digital voltage signal VTTL. The discriminator 30a is set with a predetermined value, and determines whether the digital voltage signal VTTL is greater than or equal to the predetermined value. When determining that a voltage level of the digital voltage signal VTTL is greater than or equal to the predetermined value, the discriminator 30a outputs a portion of the digital voltage signal VTTL that exceeds the predetermined value. In an embodiment, the discriminator 30a is, but not limited to, a comparator.

The counter 30b is configured for receiving the portion of the digital voltage signal VTTL that exceeds the predetermined value, generating a counting signal Ψcount, and calculating a number of the portion of the digital voltage signal VTTL that exceeds the predetermined value. The analog-to-digital converter 30c is configured for converting the counting signal Ψcount into a second analog voltage signal V2.

In an embodiment, the counter 30b and the analog-to-digital converter 30c of the digital signal processing module 30 are integrated by a field programmable gate array (FPGA).

In an embodiment, when the optical signal ν is strong, the image processing unit 40 takes the integrated first analog voltage signal $V_1'$ as intensity of the optical signal of the one of the positions-to-be-detected. Then, the image processing unit 40 controls a movable platform to obtain intensity of optical signals of the others of the positions-to-be-detected, and recombines the intensity of the optical signals of all of the positions-to-be-detected to generate the image-to-be-detected of the object-to-be-detected. When the optical signal ν is weak, the image processing unit 40 takes the number of the portion of the digital voltage signal VTTL that exceeds the predetermined value as the intensity of the optical signal of the one of the positions-to-be-detected, and generates an image-to-be-detected of the one of the positions-to-be-detected via the second analog voltage signal $V_2$. Then, the image processing unit 40 controls a movable platform to obtain images-to-be-detected of the others of the positions-to-be-detected, and recombines the images-to-be-detected of all of the positions-to-be-detected to generate the image-to-be-detected of the object-to-be-detected.

Figure 4:
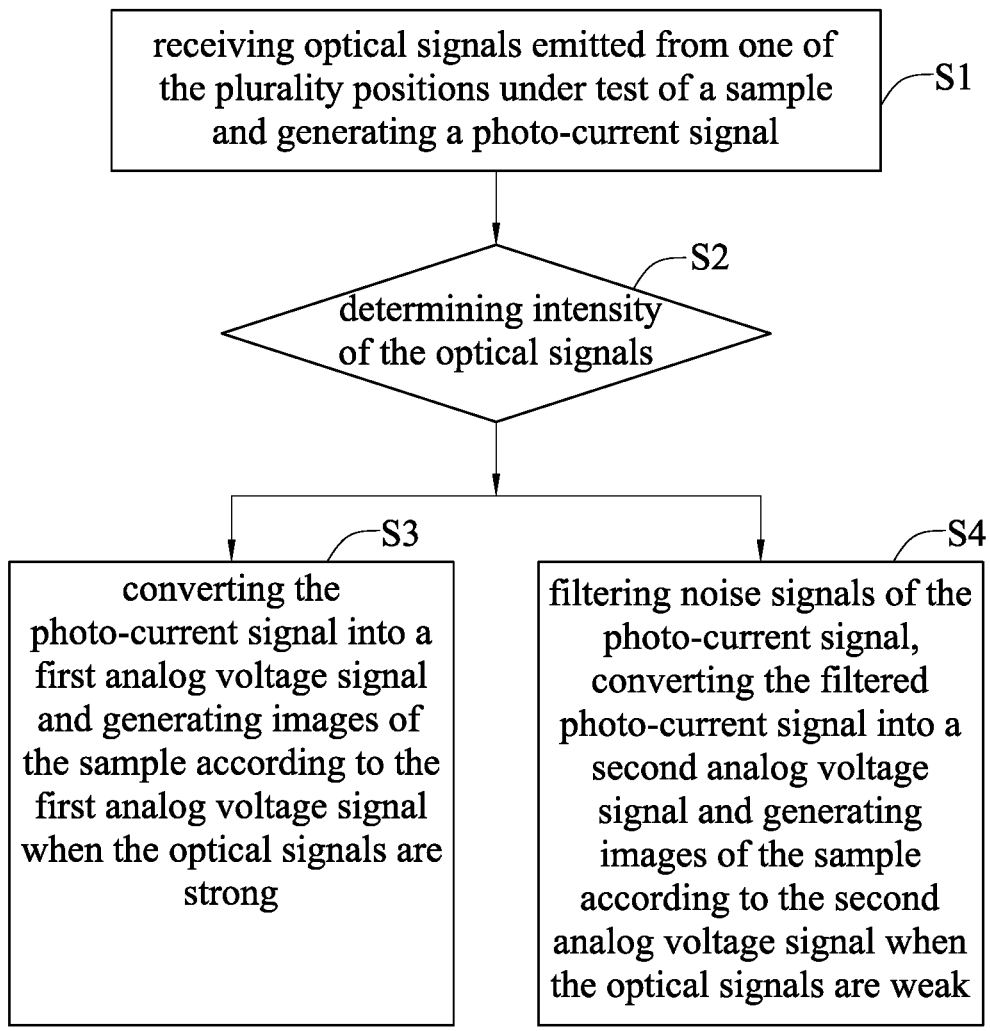
FIG. 4 is a flow chart of a signal processing method of a signal processing system of an embodiment according to the present disclosure.

FIG. 4 is a flow chart of a signal processing method of an embodiment according to the present disclosure. In step S1, an optical signals emitted from one of a plurality of positions-to-be-detected of an object-to-be-detected is received, and a photocurrent signal Iphoto is generated. In step S2, intensity of the optical signal ν is determined. When the optical signal ν is strong, step S3 is executed, in which the photocurrent signal Iphoto is converted into a first analog voltage signal $V_1$, and the image-to-be-detected of the object-to-be-detected is generated based on the first analog voltage signal $V_1$. When the optical signal ν is weak, step S4 is executed, in which noises are filtered out of the photocurrent signal Iphoto, the photocurrent signal Iphoto is converted into a second analog voltage signal $V_2$, and the image-to-be-detected of the object-to-be-detected is generated based on the second analog voltage signal $V_2$.

Figure 5:
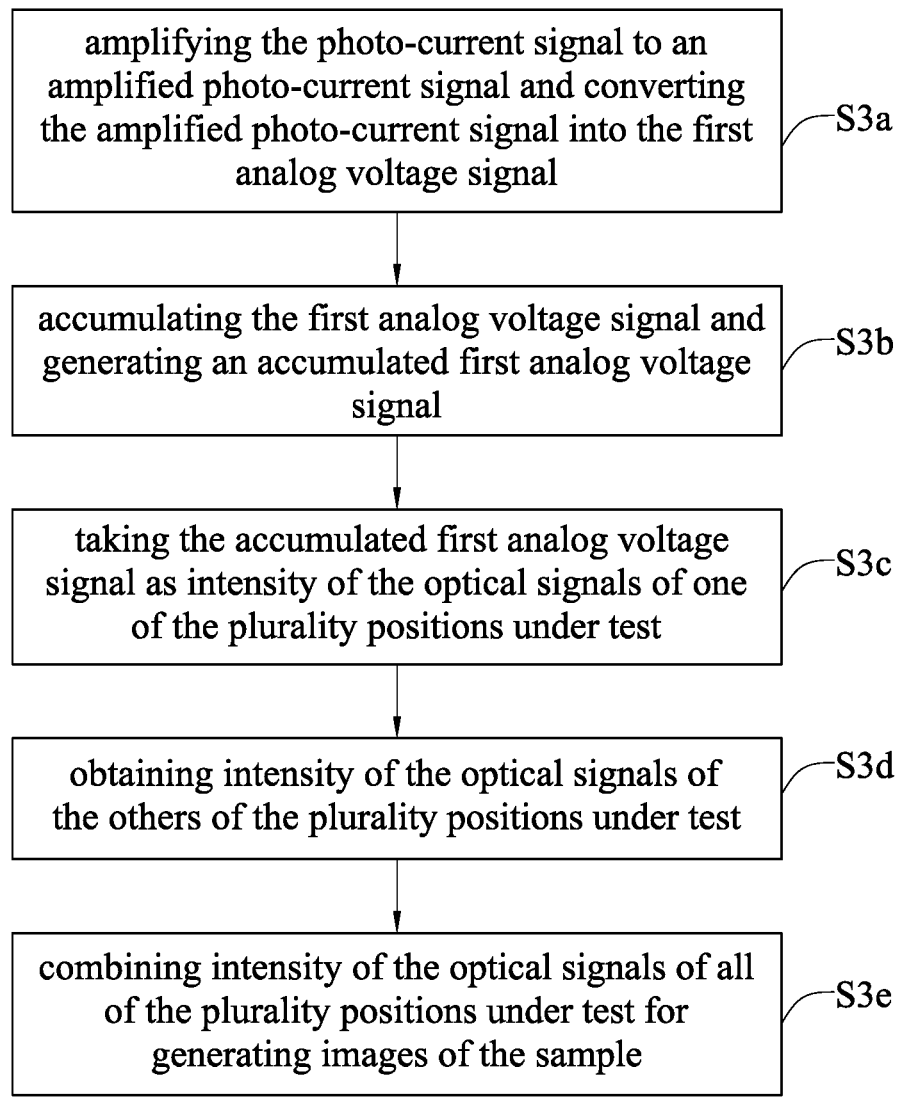
FIG. 5 is a flow chart of an analog signal processing method of a signal processing system of an embodiment according to the present disclosure.

FIG. 5 is a flow chart of an analog signal processing method of a signal processing system of an embodiment according to the present disclosure. Step S3 includes step S3a, in which the photocurrent signal Iphoto is amplified and converted into the first analog voltage signal $V_1$, step S3b, in which the first analog voltage signal $V_1$ is integrated and an integrated first analog voltage signal $V_1'$ is generated, step S3c, in which the integrated first analog voltage signal $V_1'$ is taken as intensity of the optical signal of the one of the positions-to-be-detected, step S3d, in which intensity of optical signals of the others of the positions-to-be-detected is obtained, and step S3e, in which the intensity of the optical signals of all of the positions-to-be-detected are recombined and the image-to-be-detected of the object-to-be-detected is generated.

Figure 6:
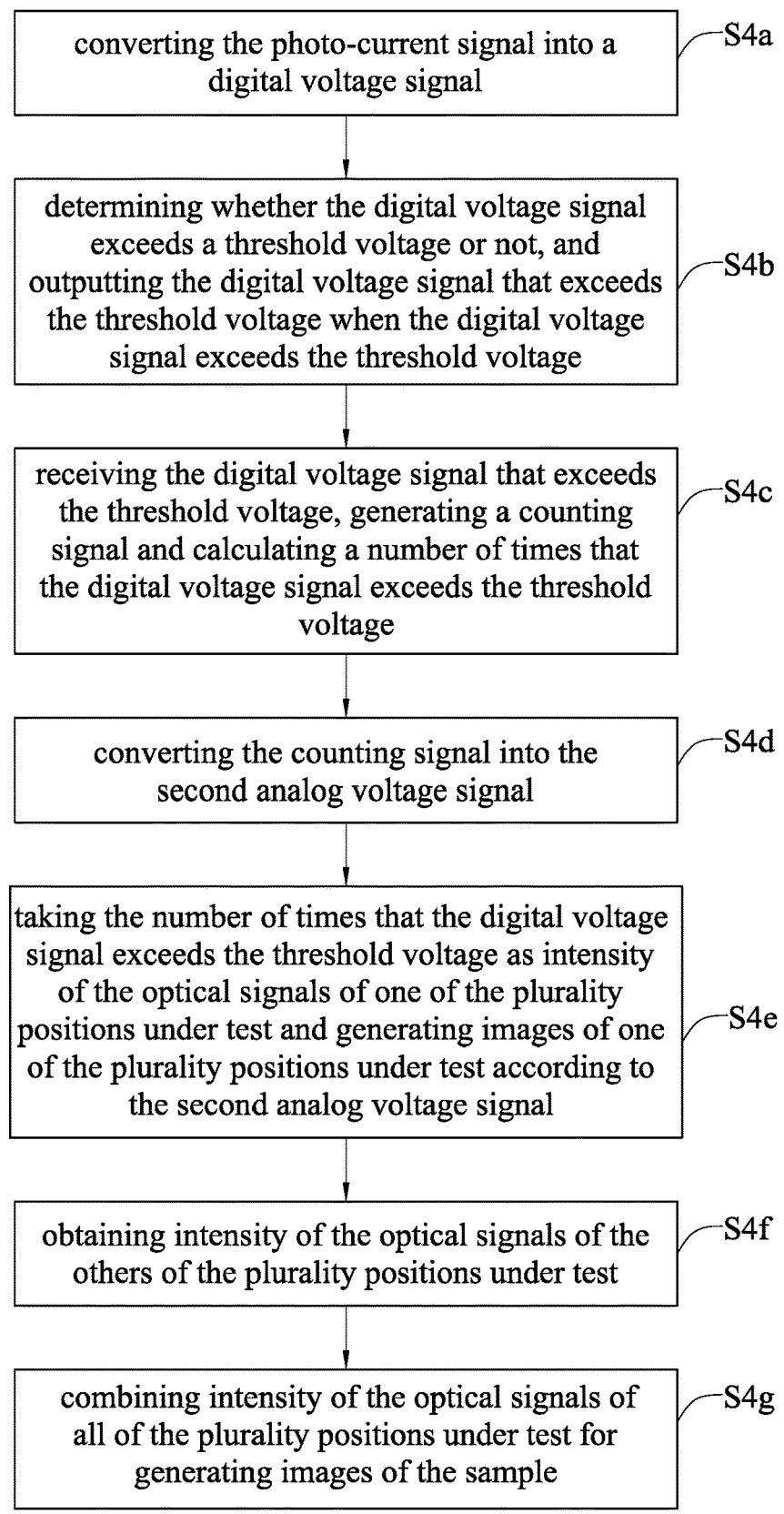
FIG. 6 is a flow chart of a digital signal processing method of a signal processing system of an embodiment according to the present disclosure.

FIG. 6 is a flow chart of a digital signal processing method of a signal processing system of an embodiment according to the present disclosure. Step S4 includes step S4a, in which the photocurrent signal Iphoto is converted into the digital voltage signal VTTL; step S4b, in which a predetermined value is set, whether the digital voltage signal VTTL is greater than or equal to a predetermined value is determined, and a portion of the digital voltage signal VTTL that exceeds the predetermined value is output when a voltage level of the digital voltage signal VTTL is greater than or equal to the predetermined value; step S4c, in which the portion of the digital voltage signal VTTL that exceeds the predetermined value is obtained, a counting signal Ψcount is generated, and a number of the portion of the digital voltage signal VTTL that exceeds the predetermined value is calculated; step S4d, in which the counting signal Ψcount is converted into the second analog voltage signal $V_2$; step S4e, in which the number of the portion of the digital voltage signal VTTL that exceeds the predetermined value is taken as intensity of the optical signal of the one of the positions-to-be-detected, and an image-to-be-detected of the one of the positions-to-be-detected is generated via the second analog voltage signal $V_2$; step S4f, in which images-to-be-detected of the others of the positions-to-be-detected are obtained; and step S4g, in which the images-to-be-detected of all of the positions-to-be-detected are recombined and the image-to-be-detected of the object-to-be-detected is generated.

The embodiments of the present disclosure have been disclosed in the foregoing description with the drawings. It will be apparent to those skilled in the art that various modifications and variations can be made to the disclosed embodiments without departing from the scope and spirit of the present disclosure. In addition, the method disclosed in the scope of the present disclosure are merely used to describe the measurement method of the present disclosure, and are not intended to limit the above methods.

What is claimed is:
1. A signal processing system, comprising:
at least one optical detector configured for receiving an optical signal emitted from one of a plurality of positions-to-be-detected of an object-to-be-detected, determining whether the optical signal is strong or weak, and generating a photocurrent signal;
an analog signal processing module configured for receiving the photocurrent signal and generating a first analog voltage signal;
a digital signal processing module configured for receiving the photocurrent signal and generating a second analog voltage signal after filtering out noises of the photocurrent signal; and
an image processing unit configured for receiving the first analog voltage signal and the second analog voltage signal, and generating an image-to-be-detected of the object-to-be-detected based on the first analog voltage signal when the optical signal is strong, or generating the image-to-be-detected of the object-to-be-detected based on the second analog voltage signal when the optical signal is weak.
2. The signal processing system of claim 1, wherein the analog signal processing module comprises:
a current amplifier configured for amplifying the photocurrent signal;

a current-to-voltage converter configured for converting the amplified photocurrent signal into the first analog voltage signal; and an integrator configured for integrating the first analog voltage signal to generate an integrated first analog voltage signal.

3. The signal processing system of claim 1, wherein the digital signal processing module comprises:

a discriminator configured for converting the photocurrent signal into a digital voltage signal, being set with a predetermined value, determining whether the digital voltage signal is greater than or equal to the predetermined value, and outputting a portion of the digital voltage signal that exceeds the predetermined value when the digital voltage signal is greater than or equal to the predetermined value;

a counter configured for receiving the portion of the digital voltage signal that exceeds the predetermined value, and generating a counting signal to calculate a number of the portion of the digital voltage signal that exceeds the predetermined value; and an analog-to-digital converter configured for converting the counting signal into a second analog voltage signal.

4. The signal processing system of claim 2, wherein when the optical signal is strong, the image processing unit takes the integrated first analog voltage signal as intensity of the optical signal of the one of the positions-to-be-detected, and then the image processing unit controls a movable platform to obtain intensity of optical signals of others of the positions-to-be-detected and recombines the intensity of the optical signals of all of the positions-to-be-detected to generate the image-to-be-detected of the object-to-be-detected.

5. The signal processing system of claim 3, wherein when the optical signal is weak the image processing unit takes the number of the portion of the digital voltage signal that exceeds the predetermined value as intensity of the optical signal of the one of the positions-to-be-detected and generates an image-to-be-detected of the one of the positions-to-be-detected via the second analog voltage signal, and then the image processing unit controls a movable platform to obtain images-to-be-detected of others of the positions-to-be-detected and recombines the images-to-be-detected of all of the positions-to-be-detected to generate the image-to-be-detected of the object-to-be-detected.

6. The signal processing system of claim 3, wherein the counter and the analog-to-digital converter are implemented by a field programmable gate array (FPGA).

7. The signal processing system of claim 3, wherein the discriminator is a comparator.

8. The signal processing system of claim 1, wherein the optical detector is a photomultiplier tube (PMT).

9. A signal processing method, comprising:

receiving an optical signal emitted from one of a plurality of positions-to-be-detected of an object-to-be-detected and generating a photocurrent signal;

determining whether the optical signal is strong or weak;

when the optical signal is strong, converting the photocurrent signal into a first analog voltage signal and generating an image-to-be-detected of the object-to-be-detected based on the first analog voltage signal; and when the optical signal is weak, filtering out noises of the photocurrent signal, converting the photocurrent signal into a second analog voltage signal, and generating an image-to-be-detected of the object-to-be-detected based on the second analog voltage signal.

10. The signal processing method of claim 9, wherein converting the photocurrent signal into the first analog voltage signal further comprises:

amplifying and converting the photocurrent signal into the first analog voltage signal; and integrating the first analog voltage signal to generate an integrated first analog voltage signal.

11. The signal processing method of claim 9, wherein converting the photocurrent signal into the second analog voltage signal further comprises:

converting the photocurrent signal into a digital voltage signal; and determining whether the digital voltage signal is greater than or equal to a predetermined value, and outputting a portion of the digital voltage signal that exceeds the predetermined value when the digital voltage signal is greater than or equal to the predetermined value;

receiving the portion of the digital voltage signal the exceeds the predetermined value, generating a counting signal, and using the counting signal to calculate a number of the portion of the digital voltage signal that exceeds the predetermined value; and converting the counting signal into the second analog voltage signal.

12. The signal processing method of claim 10, further comprising:

taking the integrated first analog voltage signal as intensity of the optical signal of the one of the positions-to-be-detected;

obtaining intensity of optical signals of others of the positions-to-be-detected; and recombining the intensity of the optical signals of all of the positions-to-be-detected to generate the image-to-be-detected of the object-to-be-detected.

13. The signal processing method of claim 11, further comprising:

taking the number of the portion of the digital voltage signal that exceeds the predetermined value as the intensity of the optical signal of the one of the positions-to-be-detected;

generating an image-to-be-detected of the one of the positions-to-be-detected via the second analog voltage signal;

obtaining images-to-be-detected of others of the positions-to-be-detected; and recombining the images-to-be-detected of all of the positions-to-be-detected to generate the image-to-be-detected of the object-to-be-detected.

* * * * *